(12) United States Patent
Chen et al.

(10) Patent No.: US 8,763,517 B2
(45) Date of Patent: Jul. 1, 2014

(54) TEA POT WITH ONE-WAY VALVE

(76) Inventors: Han Tsung Chen, Taichung (TW); Wei Fu Chen, Taichung (TW)

(*) Notice: Subject to any disclaimer, the term of this patent is extended or adjusted under 35 U.S.C. 154(b) by 419 days.

(21) Appl. No.: 13/337,161

(22) Filed: Dec. 26, 2011

(65) Prior Publication Data

US 2013/0160655 A1    Jun. 27, 2013

(51) Int. Cl.
*A47J 31/06* (2006.01)
*A47J 31/057* (2006.01)

(52) U.S. Cl.
USPC ............................................................. 99/299

(58) Field of Classification Search
USPC ................................................ 99/276–323.3
See application file for complete search history.

(56) References Cited

U.S. PATENT DOCUMENTS

2012/0024161 A1* 2/2012 Chen et al. ...................... 99/299

* cited by examiner

*Primary Examiner* — Henry Yuen
*Assistant Examiner* — Thomas Ward

(57) ABSTRACT

A tea pot is provided with a container having an upper reservoir, a lower reservoir, and an intermediate dividing member; a cavity formed with the dividing member and having an upper opening for communicating with the upper reservoir, and a lower opening for communicating with the lower reservoir; a receptacle in the upper reservoir and including a ball receiving well; a vent pipe partially positioned in the receptacle and having a passageway; a threaded recess extending outward from the cavity and being open to an outer surface of the container; a rotatable cylinder inserted through the recess into the cavity and including a hollow main body having surface openings; a nut secured to the recess; and a knob secured to the cylinder. Communication from the upper reservoir to the lower reservoir through the openings of the main body can be open or closed by turning the knob.

1 Claim, 12 Drawing Sheets

TEA POT WITH ONE-WAY VALVE

BACKGROUND OF THE INVENTION

1. Field of the Invention

The invention relates to vessels for steeping tea leaves in hot water and more particularly to a tea pot having a one-way valve.

2. Description of Related Art

Typically, tea leaves are put into a vessel and then hot water is added or vice versa. After a few minutes, a fragrant tea is made. However, a person may often carelessly drink the extracted tea leaves. It is found that the less the hot water the more extracted tea leaves being drunk by a person. Further, the flavor of tea infusion is consumed quickly.

A conventional tea steeping device comprises a cup including a conic inclined bottom, a through hole in the bottom center, a flange around the periphery of the cup bottom, a plurality of symmetric vertical holes formed on the surface of the flange, and a plurality of paired and symmetric foot plates being extended from the flange; a strainer member in the cup bottom; a disk having a ring with a diameter slightly less than the flange, the ring having a plurality of symmetric posts so as to insert into the respective holes of the flange so that the cup and the disk are capable of lifting or lowering a rod in the ring center, and holes through the foot plates on the disk adjacent the ring; a water stopper comprising a stop pad at the hole on the cup bottom, and a metal ball on the hole. The stop pad facing the top of the ball has a slot so as to be spaced from and formed with a thinner stop ring. When the cup is placed on a flat surface, the disk slides downwards along the hole and the water stopper is released so that the water stopper will apply force against the hole to block exit.

However, the conventional tea steeping device suffers from a number of problems. For example, its components are complicated. Also, it is not durable. Moreover, its manufacturing cost is relatively high. The invention is directed to solve above problems.

SUMMARY OF THE INVENTION

It is therefore one object of the invention to provide a tea pot comprising a container comprising an upper reservoir, a lower reservoir, and an intermediate dividing member for separating the upper reservoir from the lower reservoir; a top cap releasably secured to the upper reservoir; a bottom seat releasably secured to the lower reservoir; a cavity formed with the dividing member and having an upper opening for communicating with the upper reservoir, and a lower opening for communicating with the lower reservoir; a receptacle formed with the dividing member and disposed in the upper reservoir, the receptacle comprising a well including a plurality of vent holes; a ball received in the well; a conic strainer positioned on a bottom portion of the upper reservoir adjacent to the dividing member and comprising a longitudinal hole aligned with the well; a vent pipe inserted through the longitudinal hole to partially position in the receptacle adjacent to the ball, the vent pipe comprising a passageway; a threaded recess extending outward from the cavity and being open to an outer surface of the container; a rotatable cylinder inserted through the recess into the cavity and comprising a hollow main body, a reduced diameter extension extending out of the main body and facing outward, an upper set of a plurality of openings formed on the main body, and a lower set of a plurality of openings formed on the main body and being opposite to the upper set of the openings; a sealing ring for sealing a joining portion of the cylinder and the dividing member; a holed cap positioned on a recessed portion of the outer surface of the container; an externally threaded nut secured to the threaded recess to press onto the sealing ring for fastening; and a rotatable knob secured to the extension; wherein in a first position the upper set of the openings are aligned with the upper openings and the lower set of the openings are aligned with the lower openings respectively so that a communication between the upper reservoir and the lower reservoir through the main body is made possible; wherein a turning of the knob turns the cylinder a predetermined angle until the communication is blocked in a second position; and wherein a 180-degree turning of the container moves the ball from the well to the passageway for blocking.

The above and other objects, features and advantages of the invention will become apparent from the following detailed description taken with the accompanying drawings.

DETAILED DESCRIPTION OF THE INVENTION

Figure 1:
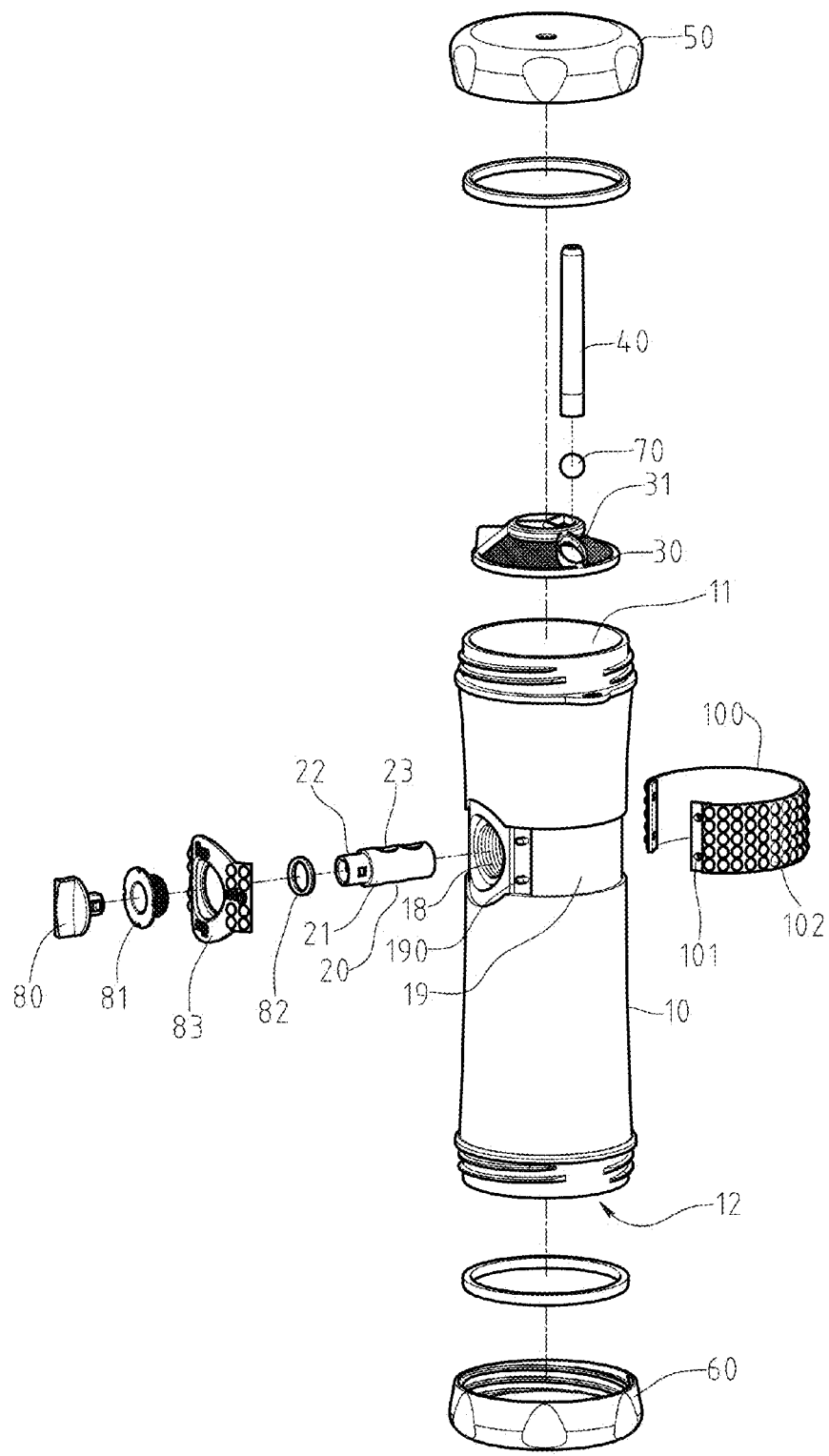
FIG. 1 is an exploded view of a tea pot according to the invention.
Figure 2:
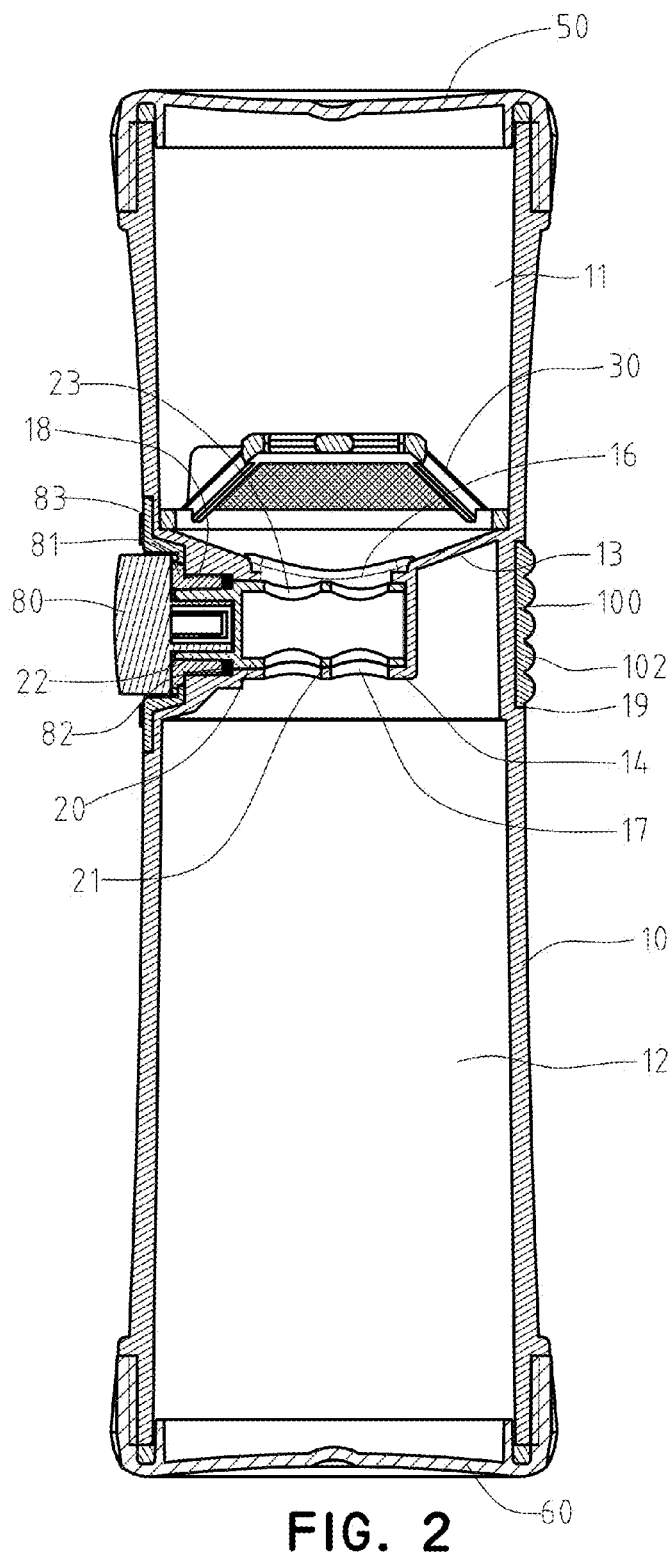
FIG. 2 is longitudinal sectional view of the assembled tea pot.
Figure 3:
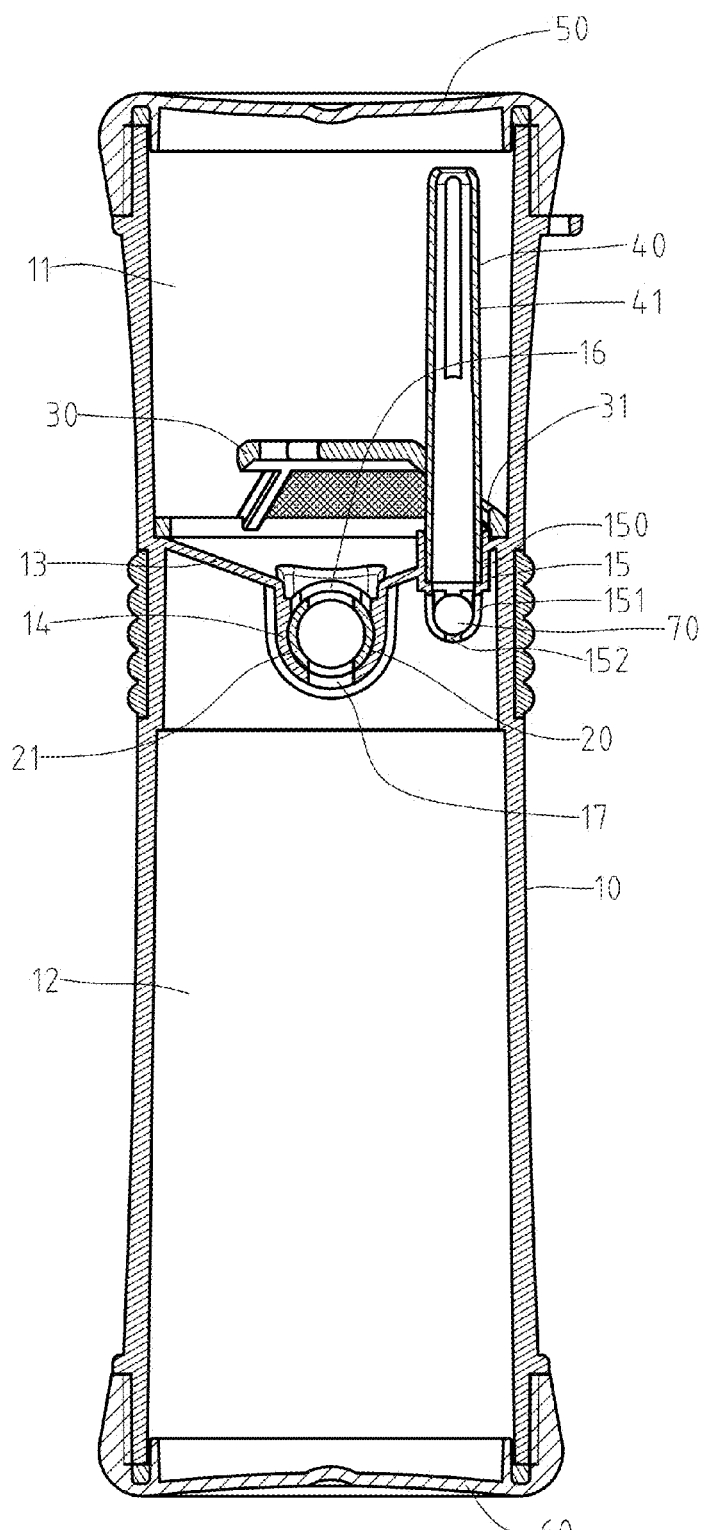
FIG. 3 is another longitudinal sectional view of the assembled tea pot showing the vent pipe.
Figure 5:
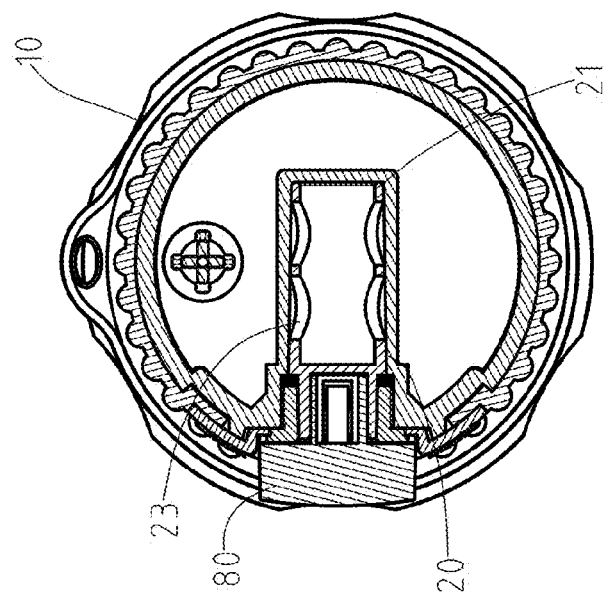
FIG. 5 is a view similar to FIG. 4 showing the upper set of the openings being closed by clockwise turning the knob.
Figure 4:
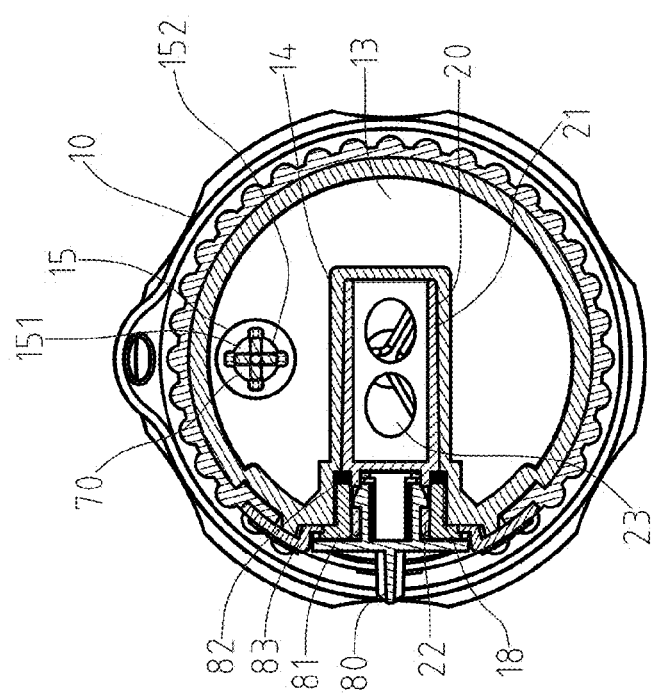
FIG. 4 is a cross-sectional view of an intermediate portion of the assembled tea pot showing the upper set of the openings being open.
Figure 6:
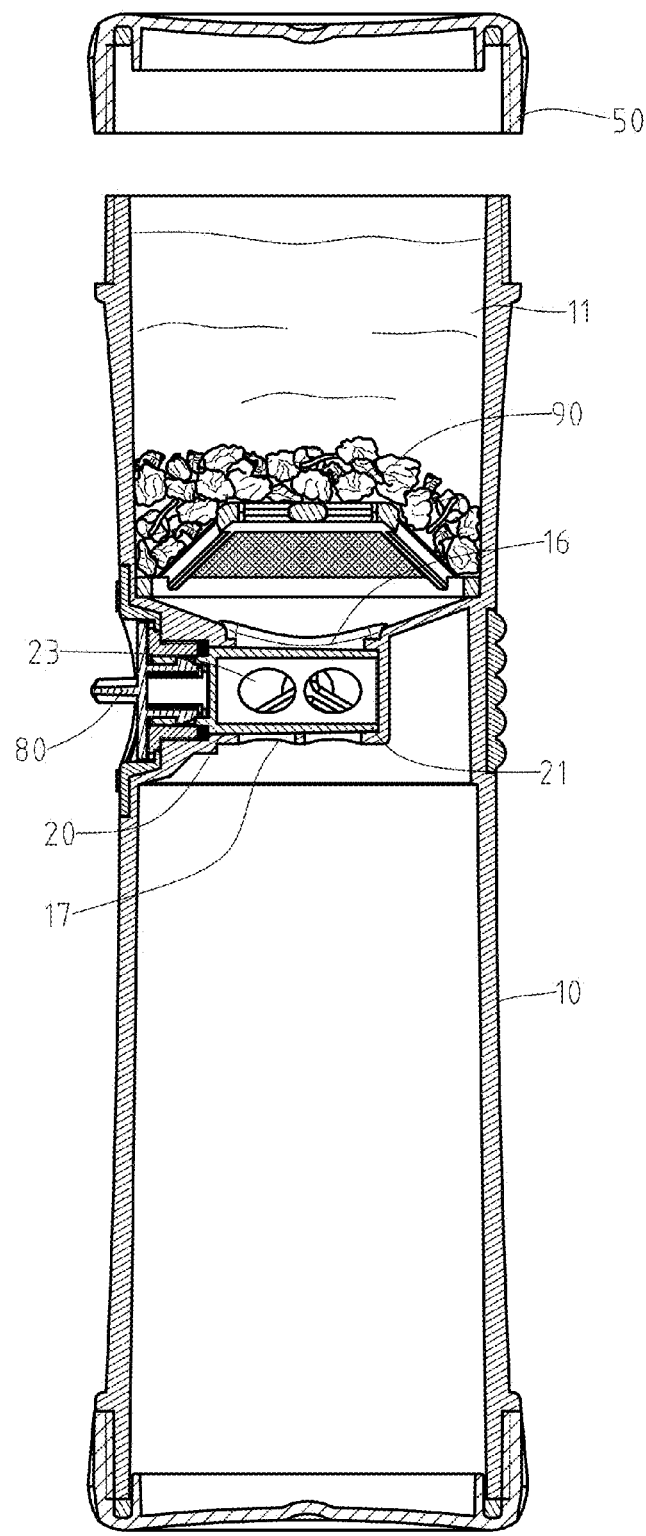
FIG. 6 is a view similar to FIG. 2 showing the top cap being removed, tea leaves being added to the upper reservoir, and hot water being added to the upper reservoir for steeping tea.
Figure 7:
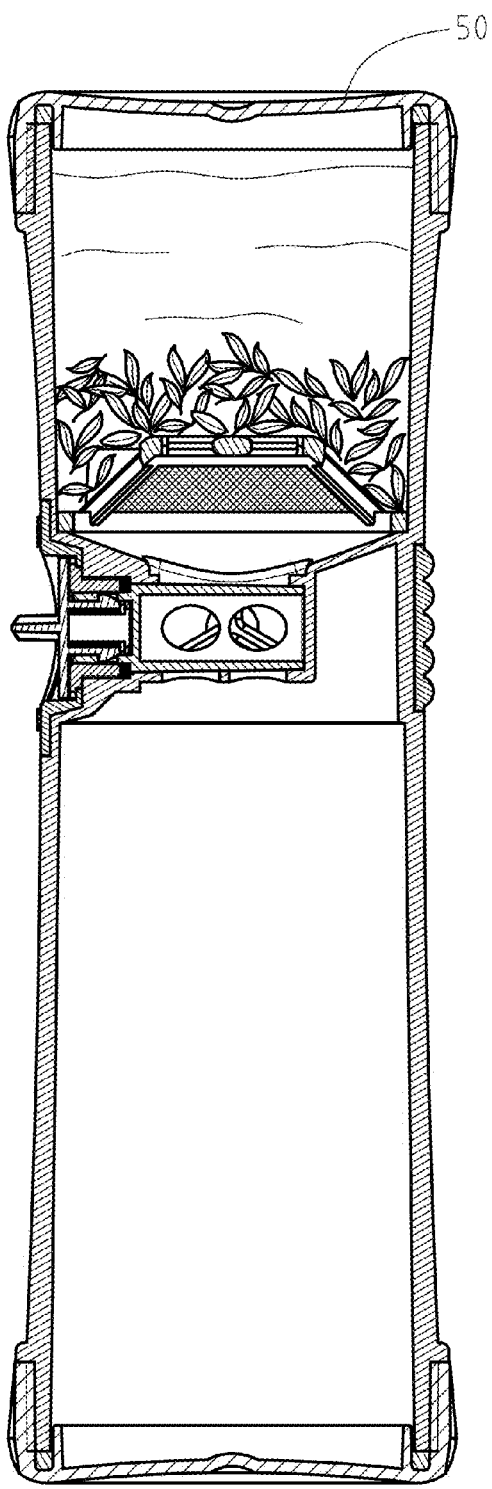
FIG. 7 is a view similar to FIG. 6 showing the top cap being put on the upper reservoir.
Figure 8:
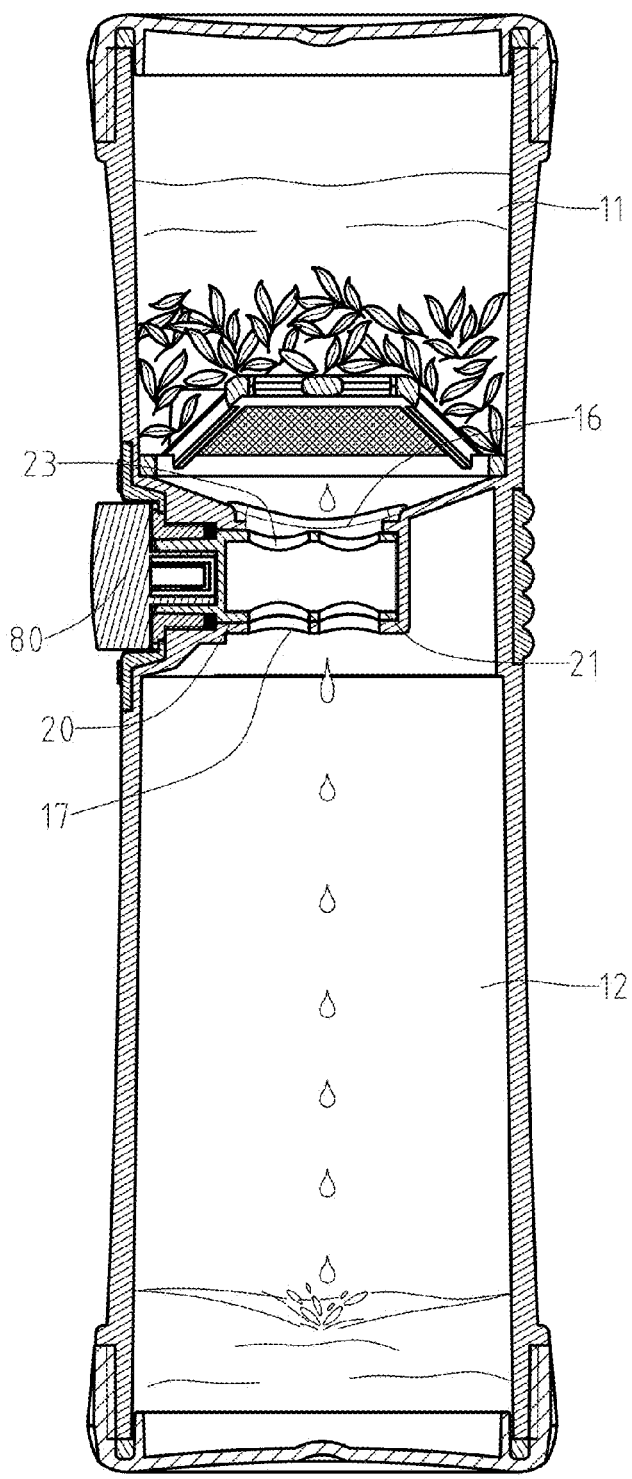
FIG. 8 is a view similar to FIG. 7 showing the flow passage through the main body of the cylinder being open by counterclockwise turning the knob for flowing tea from the upper reservoir to the lower reservoir.
Figure 9:
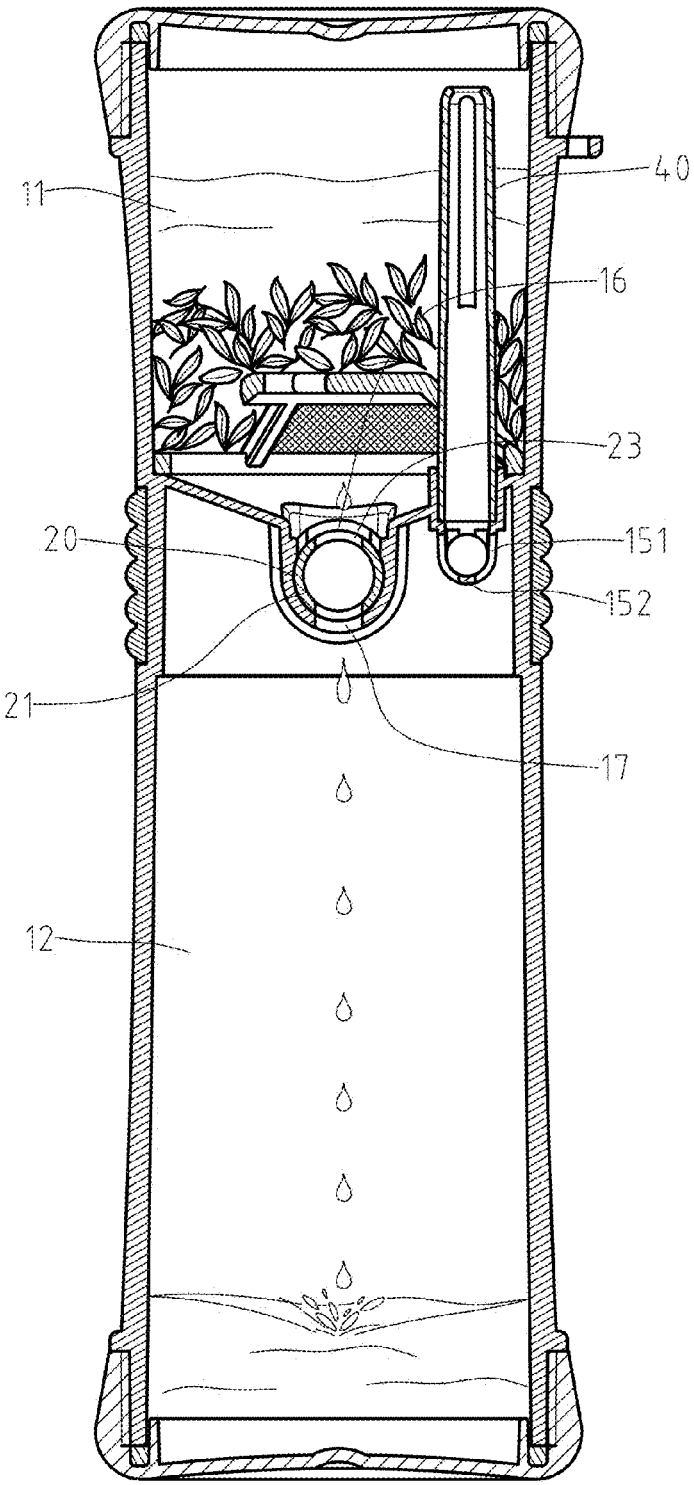
FIG. 9 is another cross-sectional view of the tea pot showing the passageway of the vent pipe being open when tea flowing from the upper reservoir to the lower reservoir.
Figure 10:
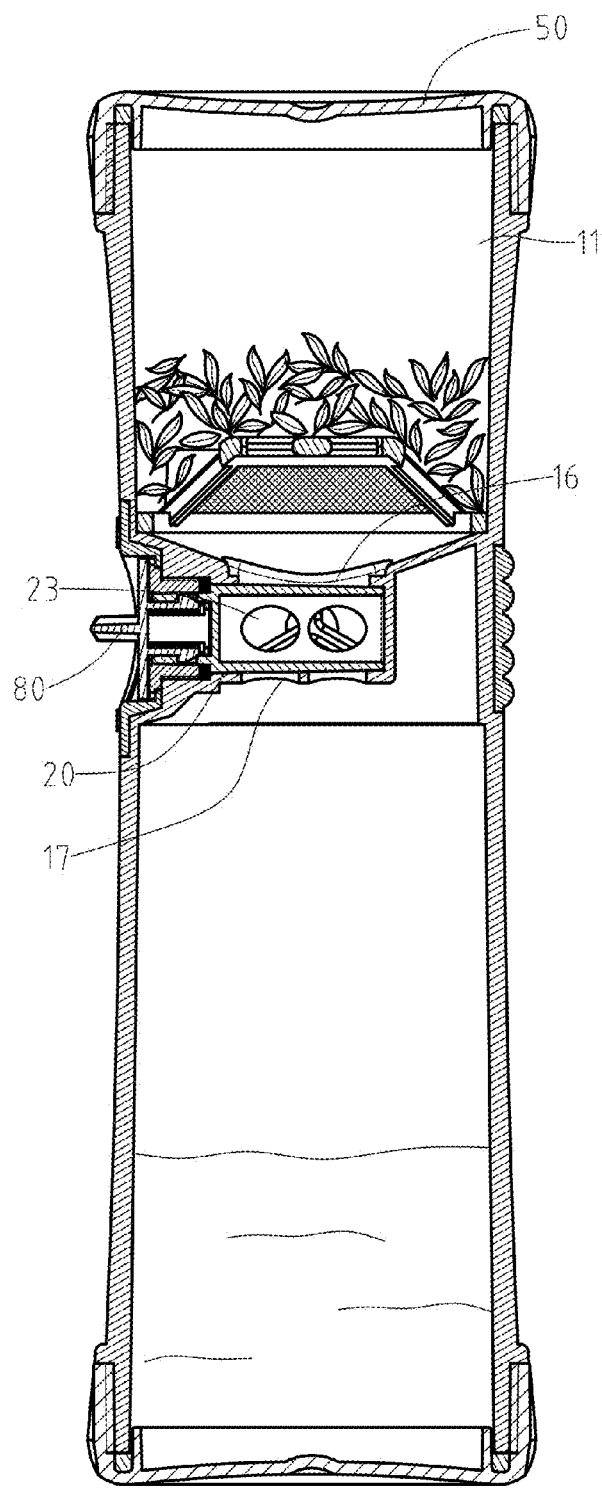
FIG. 10 is a cross-sectional view of the tea pot showing the flow passage through the main body of the cylinder being closed by clockwise turning the knob after tea completely flowing to the lower reservoir.
Figure 11:
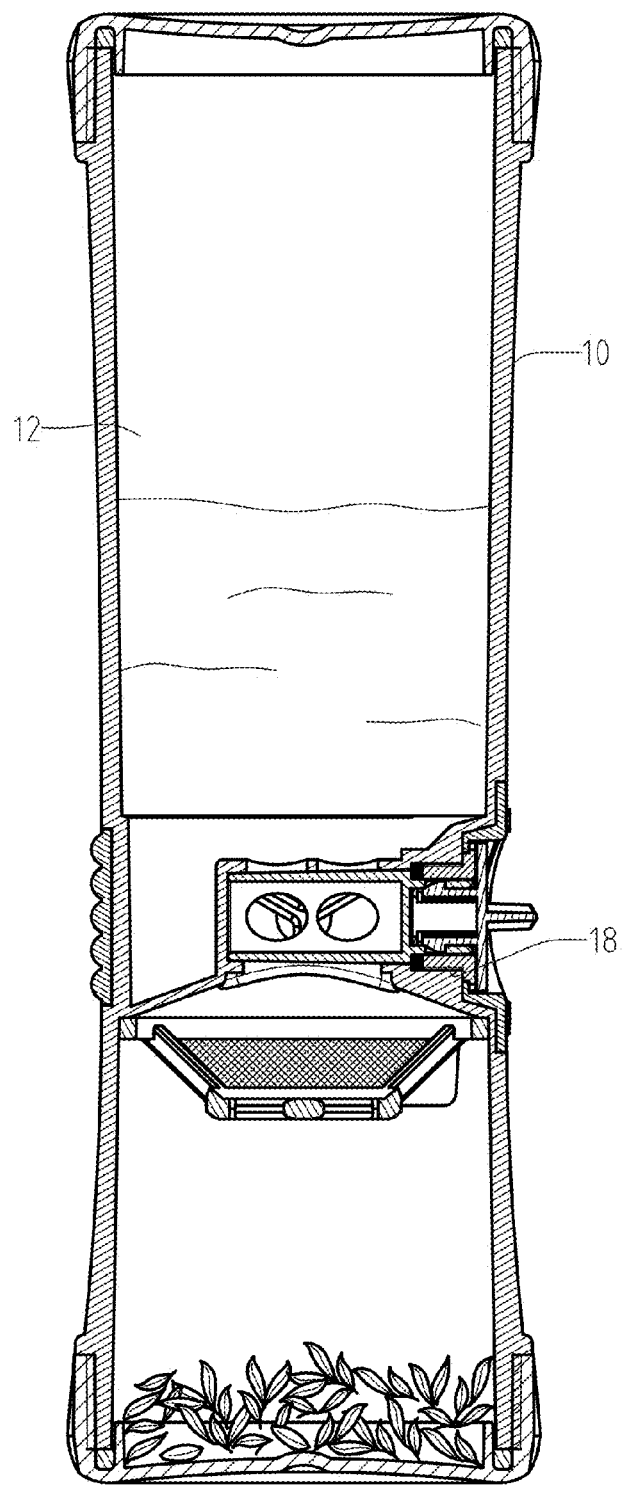
FIG. 11 is a longitudinal sectional view of the upside down tea pot.
Figure 12:
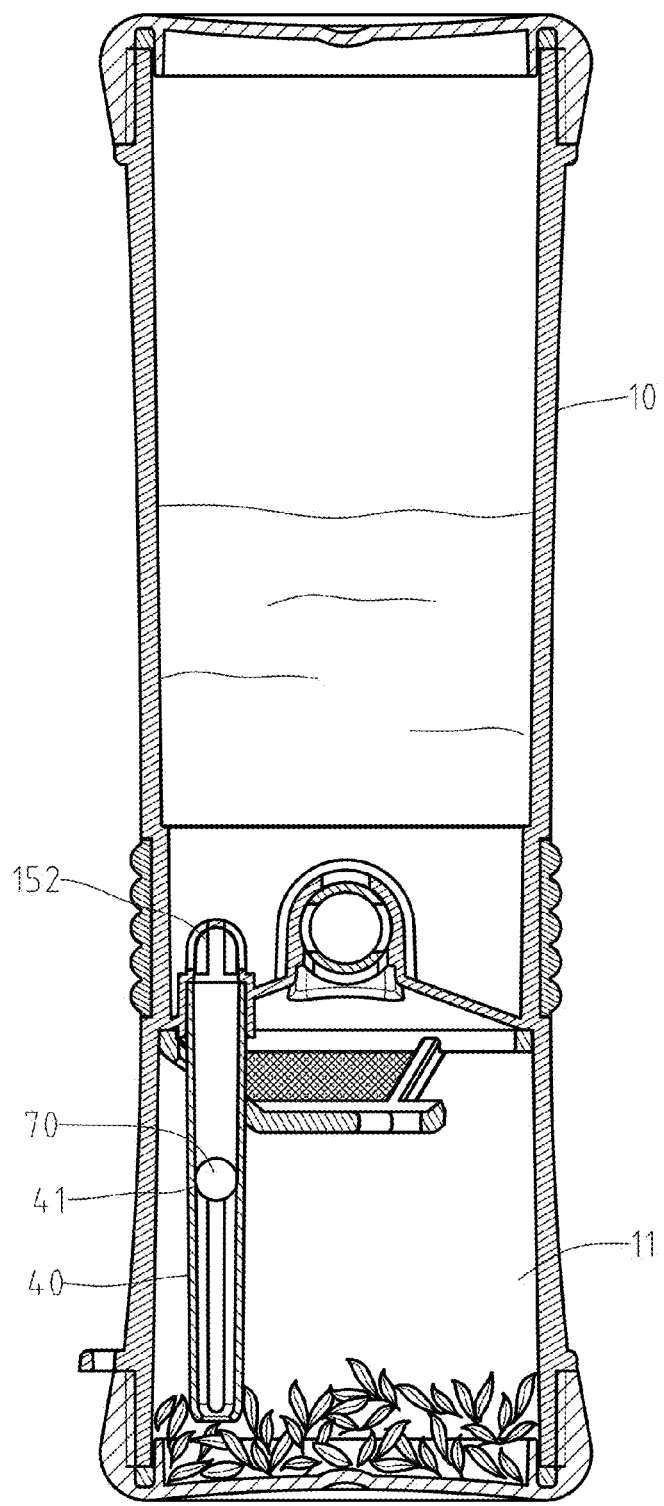
FIG. 12 is another sectional view of the upside down tea pot showing tea stored in the lower reservoir being blocked from flowing to the upper reservoir due to the closing of the one-way valve when the ball blocks the passageway of the vent pipe.
Figure 13:
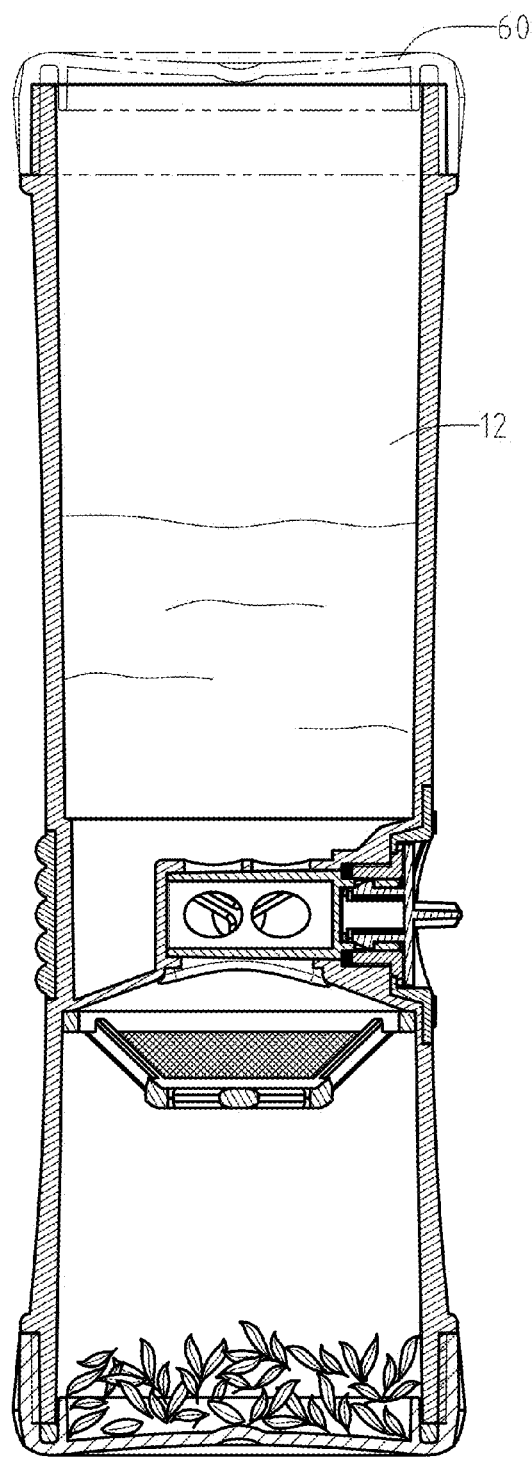
FIG. 13 is a view similar to FIG. 11 showing the removal of the bottom seat prior to serving tea.

Referring to FIGS. 1 to 13, a tea pot in accordance with the invention comprises the following components as discussed in detail below.

A cylindrical container 10 has a top portion threadedly secured to a top cap 50 and a bottom portion threadedly secured to a bottom seat 60 respectively. The container 10 comprises an upper reservoir 11, a lower reservoir 12, an intermediate dividing member 13 for separating the upper reservoir 11 from the lower reservoir 12, a cavity 14 formed with the dividing member 13 from below, an upper opening 16 on the cavity 14 for communicating with the upper reservoir 11, a lower opening 17 on the cavity 14 for communicating with the lower reservoir 12, a receptacle 15 in the upper reservoir 11, the receptacle 15 being besides the cavity 14 and perpendicular thereto, a threaded recess 18 extending outward from the cavity 14 and open to the outer surface of the container 10, a well 150 defined by the receptacle 15, a ball receiving space 152 having a plurality of vent holes 151 therearound, the ball receiving space 152 being adapted to receive a ball 70, an arc groove 19 formed on an intermediate portion of an outer surface of the container 10 about the joining portion of the upper and lower reservoirs 11 and 12, the arc groove 19 having two longitudinally disposed pegs 190 at either end.

A hollow cylinder 20 is inserted through the recess 18 into the cavity 14 and is capable of turning about the cavity 14. The cylinder 20 comprises a hollow main body 21, a reduced diameter extension 22 extending out of the main body 21 and facing outward, the extension 22 being spaced from the hollow of the main body 21 by a wall and disposed in the recess 18, and two opposite sets of a plurality of (e.g., two) openings 23 on the main body 21. The upper set of the openings 23 are aligned with the upper openings 16 and the lower set of the openings 23 are aligned with the lower openings 17 respectively in one operating position (see FIG. 4).

A sealing ring (e.g., O-ring) 82 is placed against both the shoulder of the cylinder 20 and a stepped-diameter internal structure of the container 10 adjacent to the recess 18. A holed cap 83 is positioned on a recessed portion of the outer surface of the container 10 adjacent to the arc groove 19 by snapping. An externally threaded nut 81 is secured to the threaded recess 18 to press onto the sealing ring 82 for sealing the joining circular line of the cylinder 20 and the stepped-diameter internal structure of the container 10 and fastening the sealing ring 82. The cylinder 20, and the hollow cap 83. A knob 80 has a projection tightly inserted into the extension 22 and fastened therein.

A C-shaped snapping member 100 is formed of elastomer and placed on the arc groove 19. The C-shaped snapping member 100 comprises two longitudinally disposed through holes 101 at either end, and a plurality of slip resistant protrusions 102 arranged in rows on an outer surface. The pegs 190 are inserted through the through holes 101 to position the C-shaped snapping member 100.

A conic strainer 30 is placed on a bottom portion of the upper reservoir 11 adjacent to the dividing member 13 and comprises a longitudinal hole 31 aligned with the well 150. A vent pipe 40 is inserted through the longitudinal hole 31 to partially position in the well 150 and adjacent the ball 70. As a result, the vent pipe 40 and the strainer 30 are fastened. The vent pipe 40 comprises a passageway 41.

A person may first open the container 10 by removing the top cap 50 and then turn the knob 80 in a first direction (e.g., clockwise) to turn the cylinder 20 until the upper set of the openings 23 are completely not aligned with the upper openings 16 and the lower set of the openings 23 are completely not aligned with the lower openings 17 respectively. As such, the upper reservoir 11 does not communicate with the lower reservoir 12 (see FIG. 5). The person may see through the strainer 30 to observe whether the lower reservoir 12 is closed or not. Next, the person may add tea leave into the upper reservoir 11 and pour hot water (e.g., near-boiling water) into the upper reservoir 11 sequentially or vice versa (see FIG. 6). Next, the person may put the top cap 50 on the top opening of the container 10 and threadedly secure them together for closing the container 10 (see FIG. 7). The tea leaves may steep in the upper reservoir 11 for a desired period of time. As a result, tea is prepared. Thereafter, the person may turn the knob 80 in a second direction (e.g., counterclockwise) to turn the cylinder 20 an angle so that the upper set of the openings 23 may be completely or partially aligned with the upper openings 16 and the lower set of the openings 23 may be completely or partially aligned with the lower openings 17 respectively. As a result, tea drops into the lower reservoir 12 through the strainer 30, the upper set of the openings 23, the main body 21, and the lower set of the openings 23 and the lower openings 17 for storage (see FIG. 8). Also, air in the lower reservoir 12 may flow to the upper reservoir 11 through the vent holes 151 and the vent pipe 40. The air flowed to the upper reservoir 11 balances the atmospheric pressure differences between the lower reservoir 12 and the upper reservoir 11 so as to facilitate the tea flowing through the strainer 30 and the main body 21 into the lower reservoir 12 (see FIG. 9).

After completely flowing tea to the lower reservoir 12, the person may turn the knob 80 in the first direction (e.g., clockwise) to turn the cylinder 20 until the upper set of the openings 23 are completely not aligned with the upper openings 16 and the lower set of the openings 23 are completely not aligned with the lower openings 17 respectively. As such, the upper reservoir 11 does not communicate with the lower reservoir 12 (see FIG. 10). Next, the person may turn the container 10 upside down and the ball 70 drops onto the passageway 41 to form a check valve which can prevent tea from flowing from the lower reservoir 12 to the upper reservoir 11 (see FIGS. 11 and 12). Finally, the person may unfasten the bottom seat 60 to open the lower reservoir 12 in order to drink the tea or pour tea into a cup for drink.

While the invention has been described in terms of preferred embodiments, those skilled in the art will recognize that the invention can be practiced with modifications within the spirit and scope of the appended claims.

What is claimed is:

1. A tea pot comprising:
a container comprising an upper reservoir, a lower reservoir, and an intermediate dividing member for separating the upper reservoir from the lower reservoir;
a top cap releasably secured to the upper reservoir;
a bottom seat releasably secured to the lower reservoir;
a cavity formed with the dividing member and having an upper opening for communicating with the upper reservoir, and a lower opening for communicating with the lower reservoir;
a receptacle formed with the dividing member and disposed in the upper reservoir, the receptacle comprising a well including a plurality of vent holes;
a ball received in the well;
a conic strainer positioned on a bottom portion of the upper reservoir adjacent to the dividing member and comprising a longitudinal hole aligned with the well;
a vent pipe inserted through the longitudinal hole to partially position in the receptacle adjacent to the ball, the vent pipe comprising a passageway;
a threaded recess extending outward from the cavity and being open to an outer surface of the container;
a rotatable cylinder inserted through the recess into the cavity and comprising a hollow main body, a reduced diameter extension extending out of the main body and facing outward, an upper set of a plurality of openings formed on the main body, and a lower set of a plurality of openings formed on the main body and being opposite to the upper set of the openings;
a sealing ring for sealing a joining portion of the cylinder and the dividing member;

a holed cap positioned on a recessed portion of the outer surface of the container;

an externally threaded nut secured to the threaded recess to press onto the sealing ring for fastening; and a rotatable knob secured to the extension;

wherein in a first position the upper set of the openings are aligned with the upper openings and the lower set of the openings are aligned with the lower openings respectively so that the upper reservoir communicates with the lower reservoir through the main body;

wherein a turning of the knob turns the cylinder a predetermined angle until the communication is blocked in a second position; and wherein a 180-degree turning of the container moves the ball from the well to the passageway for blocking.

\* \* \* \* \*